United States Patent [19]

Hamajima et al.

[11] Patent Number: 4,499,542
[45] Date of Patent: Feb. 12, 1985

[54] AUTOMATIC TRANSMISSION CONTROL SYSTEM WITH RESET

[75] Inventors: Shigemitsu Hamajima, Oobu; Tomoaki Nishimura, Toyota; Naoji Sakakibara, Chiryu; Shoji Kawata, Okazaki, all of Japan

[73] Assignee: Aisin Seiki Kabushiki Kaisha, Kariya, Japan

[21] Appl. No.: 368,476

[22] Filed: Apr. 14, 1982

[30] Foreign Application Priority Data

Apr. 20, 1981 [JP] Japan ................... 56-59601

[51] Int. Cl.³ .................. B60K 41/08; G06F 15/20
[52] U.S. Cl. ........................ 364/424.1; 74/866
[58] Field of Search ............... 364/424.1; 74/866

[56] References Cited

U.S. PATENT DOCUMENTS

| | | | |
|---|---|---|---|
| 4,253,348 | 3/1981 | Will et al. | 74/866 |
| 4,354,236 | 10/1982 | Miki et al. | 364/424.1 |
| 4,363,973 | 12/1982 | Kawata et al. | 364/424.1 X |
| 4,365,526 | 12/1982 | Suga et al. | 74/866 |
| 4,380,048 | 4/1983 | Kishi et al. | 364/424.1 |
| 4,393,732 | 7/1983 | Suzuki et al. | 74/866 |

OTHER PUBLICATIONS

Carnes et al.: Processor Checking, IBM Technical Disclosure Bulletin, vol. 17, No. 11–Apr. 1975, pp. 3188, 3189.

*Primary Examiner*—Felix D. Gruber
*Attorney, Agent, or Firm*—Sughrue, Mion, Zinn, Macpeak, and Seas

[57] ABSTRACT

A speed range control system setting an automatic transmission at a proper speed range in accordance with throttle opening and vehicle traveling speed. The system detects a sudden fall in the level of a vehicle speed signal under the anomalous conditions such as disconnection of a vehicle speed signal line or slippage of wheels due to emergency braking, and then sets the automatic transmission at a safety speed range. After setting at the safety speed range, the speed range of the automatic transmission is set in accordance with the throttle opening and vehicle traveling speed after counting a predetermined number of vehicle speed signal pulses generated in conjunction with rotation of a drive shaft.

8 Claims, 3 Drawing Figures

AUTOMATIC TRANSMISSION CONTROL SYSTEM WITH RESET

BACKGROUND OF THE INVENTION

The invention relates to a controller for an automatic transmission for use in automobile vehicles, in particular, to a control system which comprises an anomaly detecting means for detecting anomalies occurring on a speed signal line and on signal processing circuits, and which sets the transmission at a predetermined speed stage for the purpose of safety when the anomaly is detected.

An automatic transmission control system having been generally used includes a control circuit which receives a speed responsive signal and a signal indicative of output torque or throttle opening of the engine as input signals, compares both signals with each other, and then outputs a speed range control signal to the transmission. The speed responsive signal is, for example, supplied from a well known vehicle speed sensor of the reed switch type which generates pulses in response to rotation of a drive shaft. A reed switch incorporated in the speed sensor is opened or closed in accordance with the magnetic field generated by a magnet rotating together with the drive shaft. The vehicle velocity sensor is normally disposed at a position near the drive shaft or within a speed meter, but there may occur disconnections in a signal line between the reed switch and the control circuit. In the event of such disconnection, the signal line generally assumes the same electric potential as that which occurs while the vehicle is stopped. When using the reed switch with one end thereof connected to a reference potential or a ground potential and the other end connected to a positive constant voltage source, for example, the signal line will remain at ground level when the line is short-circuited to ground or the reed switch sticks at the closed state, for example, due to the formation of deposits thereon, whereas the signal line will remain at a positive voltage when the line is disconnected or the reed switch sticks at the opened state due to breakage thereof. Thus, the speed responsive signal assumes the same level as that which occurs while the vehicle is stopped. At such occasion, the control circuit in the automatic transmission control system makes a decision that the vehicle has stopped, and hence issues the speed range control signal allowing the transmission to be shifted to the speed step for a low speed (for example, the 1st speed). However, should the vehicle be traveling at a high speed, the abrupt shift down to the 1st speed entails a sudden engine braking, thereby resulting in a large shock which may damage the transmission or engine.

Such a problem can be solved by an improved system which includes an anomaly detecting means adapted to detect anomalies occurring in a signal line from a decision reference indicator detecting means such as a vehicle speed detecting switch or a throttle opening detecting switch to the control circuit making a decision on speed range, and which can set and lock the automatic transmission at a safety speed range in the anomalous condition. However, depending on the conditions while traveling, it sometimes occurs that a signal similar to that obtained in the anomalous condition will appear even if the signal line operates normally. For example, when the vehicle traveling at a high speed is subjected to emergency braking and the wheels of the vehicle stop their revolutions, the vehicle speed signal assumes a low level similarly to the case where the signal line is disconnected or short-circuited. On such an occasion, it is preferable to promptly release the anomalous setting (safety locking) which otherwise would be maintained in the anomaly detecting means and the control circuit.

SUMMARY OF THE INVENTION

An object of the present invention is to provide an automatic transmission control system in which an automatic transmission is locked at a safety speed range in response to anomalies occurring in a signal line or signal processing circuits and this locking is released when the signal on the line returns to indicate a normal condition.

The above object is accomplished in accordance with the present invention by incorporating an anomaly detecting means adapted to detect anomalies in a speed range reference signal line or signal processing circuits and issue an anomaly detection signal to a speed range controller, further incorporating a reset means adapted to release the anomaly detecting means from the anomaly detecting state in response to a normal signal in the speed range reference signal or the signal processing circuits, and locking the automatic transmission at a predetermined speed range through the speed range controller during the anomaly detecting state of the anomaly detecting means. By so doing, the automatic transmission is forcedly locked at the safety speed range while the signal line is subject to the anomalous condition and then set to a proper speed range in accordance with the traveling condition after the signal line has returned to indicate the normal condition. Even if the automatic transmission is forcedly locked at the safety speed range under the unusual conditions such as emergency braking, the locked state is automatically released upon return to normal traveling.

Other objects and features of the invention will become apparent from the following description of preferred embodiments with reference to the drawings.

DESCRIPTION OF EMBODIMENTS

Figure 1:
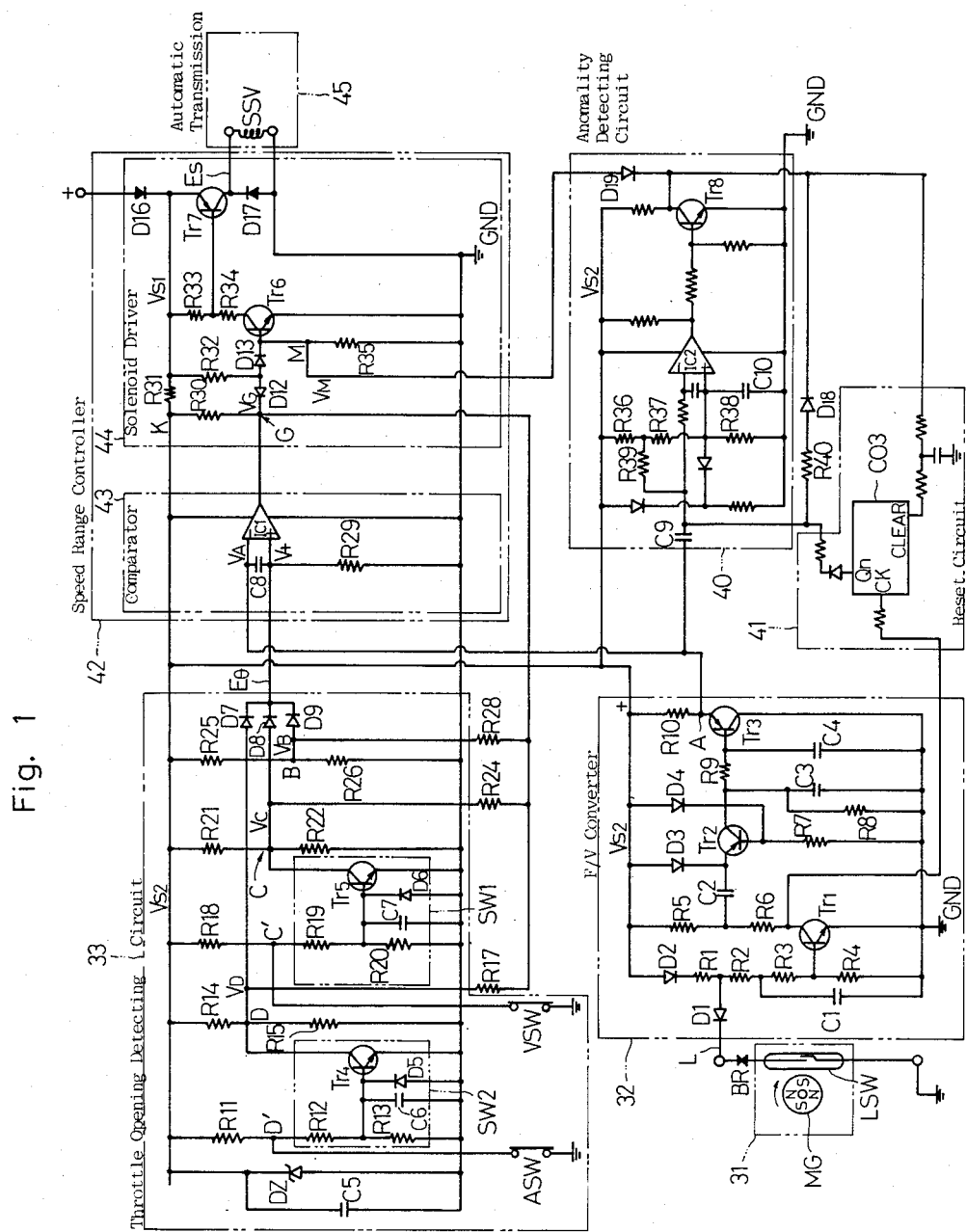
FIG. 1 is a circuit diagram illustrating one embodiment of the invention.

Referring to FIG. 1 there is shown, as one embodiment of the invention, an automatic transmission control system comprising a vehicle speed sensor 31 serving as a vehicle speed responsive signal generating means, an FV (frequency-voltage) converter 32 serving as a vehicle speed signal processing unit, a throttle opening detecting circuit 33, an anomaly detecting circuit 40, a reset circuit 41 and a speed range controller 42. The speed range controller 42 controls an automatic transmission 45 to select any one of the speed ranges.

A reed switch LSW incorporated in the vehicle velocity sensor 31 of reed switch type has one terminal connected to an input terminal of the FV (frequency-voltage) converter circuit 32 and the other end connected to the ground level of a vehicle body. A magnet MG is rotated in conjunction with rotation of a drive shaft, and the reed switch LSW repeats its ON/OFF state at a frequency proportional to a rotational speed of the magnet MG. With a circuit so arranged that the reed switch LSW is serially connected to a resistor R1 and in parallel to resistors R2, R3 and R4, a constant peak pulse signal appears at a terminal L of the FV converter circuit 32. The design and operation of the FV converter circuit 32 is well known, so that a detailed description thereof will be omitted. By way of brief description, the circuit 32 comprises transistors Tr1–Tr3, diodes D1–D4, resistors R1–R10 and capacitors C1–C4. These components are connected to form a shaping circuit, a differentiation circuit, an integration circuit and a buffer amplifier arranged in sequence starting from the signal input terminal L. An output terminal A of the conversion circuit 32 is given by an emitter terminal of a pnp-transistor Tr3 (for the buffer amplifier, the collector grounded) which is connected via the resistor R10 to a $+V_{S2}$ terminal in common with the controller 42. A minus terminal of the FV conversion circuit 32 is connected to ground. The reed switch of the vehicle speed sensor 31 has its plus terminal (output terminal) connected to a cathode of the Diode D1 in the FV converter circuit 32. The output terminal A of the FV converter circuit 32 is connected to a minus input terminal of a comparator IC1 in a comparator circuit 43.

The throttle opening detecting circuit 33 includes at the output side thereof an OR circuit (D7–D9) which serves to selectively supply signal voltages $V_B$, $V_C$ and $V_D$ in accordance with three steps of the throttle opening, respectively, to the comparator IC1 in the comparison circuit 43 via the respective diodes D9, D8 and D7. The signal voltages $V_B$, $V_C$ and $V_D$ are obtained by dividing the constant voltage $V_{S2}$ with three pairs of resistors R25 and R26, R21 and R22, and R14 and R15, respectively. Terminals B, C and D outputting the signal voltages $V_B$, $V_C$ and $V_D$, respectively, are connected (positive feed-back) to an output terminal G of the comparator IC1 via respective resistors R28, R24 and R17. Thus, the voltages $V_B$, $V_C$ and $V_D$ at the voltage dividing terminals B, C and D assume three voltage levels different from one another in the relationship of $V_B < V_C < V_D$, which levels are fundamentally determined by each set of three resistors R25, R26 and R28; R21, R22 and R24; and R14, R15 and R17, respectively.

Among these three throttle opening response voltage output terminals B, C and D, the terminal B is connected to ground via the resistor 26, while the terminal C is connected to ground via a switch circuit SW1 mainly composed of a transistor TR5. The switch circuit SW1 has a switching control voltage input terminal C' which is selectively connected to ground via a throttle opening detecting switch VSW (such as a negative pressure detecting vacuum switch provided in an inlet system for the engine) and is also connected to a constant voltage circuit (referred to as + side hereinafter) $V_{S2}$ via a resistor 18. The remaining terminal D' is selectively connected to ground via a switching circuit SW2 mainly composed of a transistor Tr4, similarly to the terminal C'. The switch circuit SW2 has a switching control voltage input terminal D' which is selectively connected to ground via another throttle opening detecting switch ASW (such as an accelerator position detecting switch or a switch of the same kind as the VSW but having a different operating point) and also connected to the + side $V_{S2}$ via a resistor R11. A Zener diode ZD (backward direction) connected to a capacitor C5 in parallel is grounded at one end and is connected at its other end to the + side $V_{S2}$ of the throttle opening detecting circuit 33 which generates a signal $E_\theta$ with its level relating to the output torque of the engine.

The npn-transistor Tr5 in the switch circuit SW1 has the emitter grounded and the collector connected to the voltage dividing terminal C. The base of the transistor Tr5 is branched to two lines, one of which is connected to a diode D6 (backward direction), a capacitor C7 and a resistor 20 in parallel and then grounded, and the other of which is connected to the + side $V_{S2}$ via a resistor 19, the terminal C' and the resistor 18. The npn-transistor Tr4 in the switch circuit SW2 has the collector connected to the voltage dividing terminal D and the base connected to the terminal D' via a resistor 12 and then to the + side $V_{S2}$ via the resistor R11, the base being at the same time connected to ground via a diode D5, a capacitor C6 and a resistor R13, respectively.

Outputs from the diodes D7–D9 constituting an OR gate are led to the comparator 43 in the form of the throttle opening signal $E_\theta$. The following Table 1 shows the relationship between the opening/closing of the switches ASW and VSW and the voltage level of $E_\theta$.

TABLE 1

| Throttle opening detecting switch | | Switching circuit | | |
|---|---|---|---|---|
| ASW | VSW | SW2 | SW1 | $E_\theta$ |
| open | open | on | on | $V_B$ |
| open | close | on | off | $V_C$ |
| close | close | off | off | $V_D$ | where $V_B < V_C < V_D$

The comparator IC1 in the comparison circuit 43 has a minus input terminal which receives the output from the FV conversion circuit 32 or a vehicle velocity signal $V_A$, and a plus input terminal which receives the throttle opening signal $E_\theta$. The output terminal G of the comparator IC1 is connected via a resistor 30 to the + side $V_{S2}$, which is in turn connected to the + side $V_{S1}$ via a serial resistor R31. Further, a diode 12 and a resistor R32 are connected to serial resistors 30 and 31 in parallel. The $V_{S2}$ line of the FV converter circuit 32 is connected to an output terminal K of the resistor R31. The $V_{S1}$ line is connected to a positive constant voltage power supply via a diode 16. A cathode of the diode D16 is connected via serial resistors R33 and R34 to the collector of an npn-transistor Tr6, which has the emitter grounded and the base connected via a diode 13 to a terminal between the resistor 32 and the diode D12. The base of the transistor Tr6 is also grounded via a resistor 35. The collector thereof is also connected to the base of an npn-transistor Tr7 via a resistor R34. The transistor Tr7 has the emitter connected to the $V_{S1}$ line and the collector connected to a diode D17 and a coil of a shift solenoid valve SSV for the automatic transmission 45. The automatic transmission 45 is of known solenoid control type with speed range in two steps.

The anomaly detecting circuit 40 will be now described. In the anomaly detecting circuit 40, the vehicle velocity analog signal $V_A$ is differentiated by a capacitor C9 and a resulting differentiation signal is applied to a minus input terminal of a comparator IC2. On the other hand, $V_{S2}$ is applied to a serial circuit comprising R36, R37 and R38, and the divided voltage (constant voltage) across R38 is applied to a capacitor C10. Voltage across the capacitor C10 is applied to a plus input terminal of the comparator IC2. The minus input terminal of the comparator IC2 is supplied via a resistor R39 with the voltage across the resistors R37 and R38, so that the minus input terminal of the comparator IC2 normally assumes a higher voltage than that at the plus input terminal thereof. As a result, the output of the comparator IC2 becomes a negative level and hence an output transistor Tr8 remains OFF. In the normal acceleration or deceleration, the rate of change of the vehicle speed is so low that the vehicle speed signal $V_A$ also has a low rate of change and the capacitor C9 does not generate any substantial differentiation signal. However, when the reed switch LSW is subject to disconnection or short-circuit troubles, or when the wheels are locked due to emergency braking on low friction roads, travel responsive pulses are interrupted and hence the vehicle speed signal $V_A$ is reduced in its level at the most rapid speed which is determined by a time constant of the resistors R8, R9 and the capacitors C3, C4 in the FV converter circuit 32. At this time, the potential at an electrode of the differentiation capacitor C9 on the side of the comparator IC2 is lowered and hence the output from the comparator IC2 turns to a positive level, thus causing the transistor Tr8 to conduct. Upon conduction of the transistor Tr8, the minus input terminal of the comparator IC2 is held at a low potential via a resistor R40 and a diode D18, whereby the output of the comparator IC2 will remain at a positive level and the transistor Tr8 will remain ON (anomaly detecting state). Since the transistor Tr8 has the collector connected via a diode D19 to the base of the transistor Tr6 of a solenoid driver 44, the transistor Tr6 is locked at OFF in the anomaly detecting state.

To sum up the above, the automatic transmission 45 sets either one of its speed ranges as shown in the following Table 2.

TABLE 2

| Conditions | | IC1 output | IC2 output | Tr8 | Tr6 | Tr7 | Speed range |
|---|---|---|---|---|---|---|---|
| Normal state | $E_\theta \geq V_A$ | plus | minus | off | on | on | the 1st speed |
| | $E_\theta < V_A$ | minus | minus | off | off | off | the 2nd speed |
| Anomaly detecting state | | | plus | on | off | off | the 2nd speed |
| | | | plus | on | off | off | the 2nd speed |

The reset circuit 41 will be now described. A counter CO3 in the reset circuit 41 remains under the cleared state while its CLEAR input terminal is held at a plus level, and starts to count up when the terminal turns to the ground level. The collector voltage of the transistor Tr8 in the anomaly detecting circuit 40 is applied to the CLEAR input terminal, so that the counter CO3 is cleared while the anomaly detecting circuit 40 is under the normal condition, and starts to count up when the circuit 40 turns to the anomaly detecting state. On the other hand, the counter CO3 has a count pulse input terminal CK which is supplied with the collector voltage of the transistor Tr1 in the FV converter circuit 32, namely inverted pulses of the vehicle velocity response pulses appearing at the terminal L. The counter CO3 does not start to count up and waits for coming of pulses even under the anomaly detecting state because there appears no vehicle speed responsive pulse. Therefore, in the case that the anomaly detecting circuit 40 turns to the anomaly detecting state due to troubles in the path from the sensor 31 to the terminal L, the counter CO3 remains in the non-counting state and the circuit 40 is held at the anomaly detecting state until such troubles are repaired. When there appear the vehicle speed responsive pulses upon repair of the troubles or release of the emergency braking which has caused the anomaly detecting state, the counter CO3 starts to count up. Then one of count code output terminals Qn turns to a pulse level when the counted value reaches a predetermined value. This pulse level is applied to the minus input terminal of the comparator IC2 and this causes the output of the comparator IC2 to be changed to a minus level, whereupon the transistor Tr8 turns to OFF and the circuit 40 returns to the normal condition. With Tr8 turning to OFF, the CLEAR input becomes plus so that the counter CO3 returns to the cleared state.

As shown in Table 2, the speed range of the transmission is set at the 2nd speed when anomalies are detected. This is due to the fact that in the event there occur disconnections or short-circuits in the path from the sensor 31 to the terminal L while traveling at a high speed (the 2nd speed), the shift down to the 1st speed causes a large change in vehicle speed, thus making the driver face a danger and resulting in a fear that the clutch system, engine system and wheel driving system may be subject to a large shock. If the transmission is changed from the 1st speed to the 2nd speed during a problem state or during engine braking, an engine load becomes larger and hence the coupling ratio is reduced in the clutch control system. As a result, large shocks will not occur.

Figure 2:
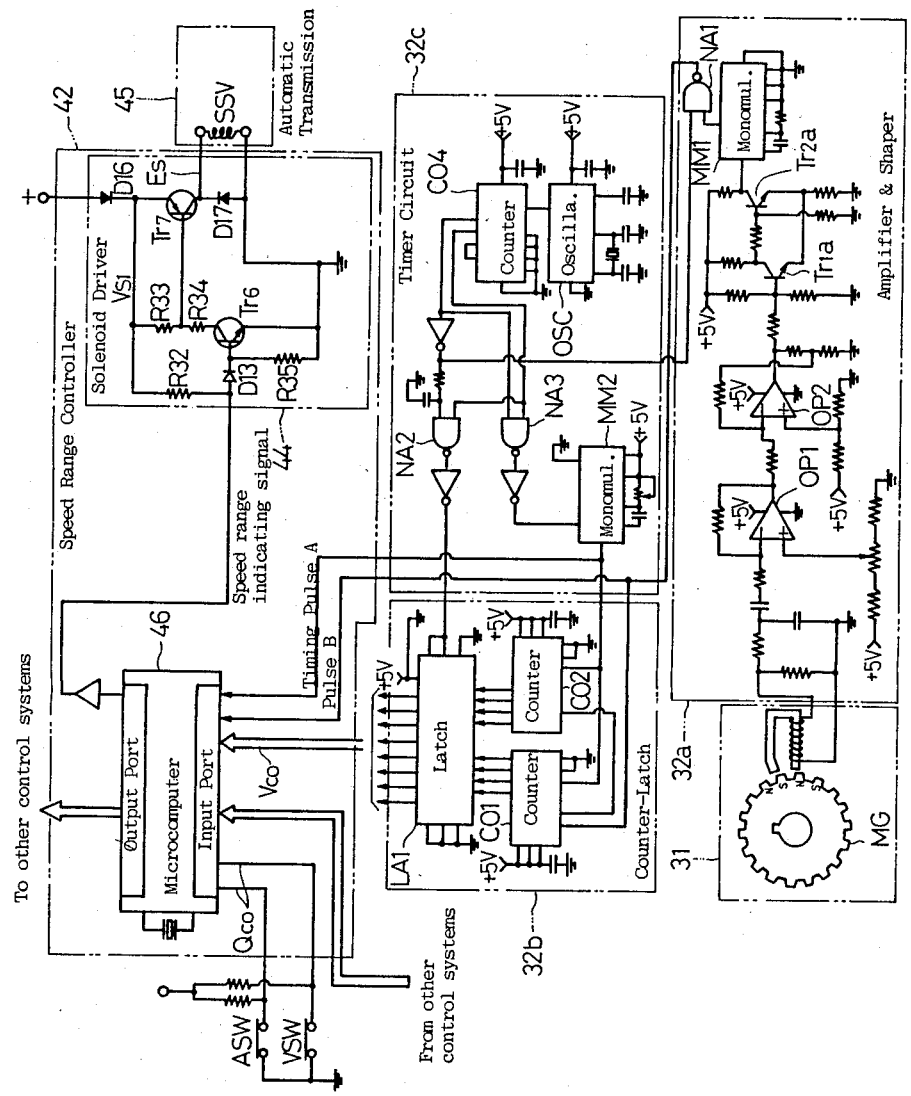
FIG. 2 is a block diagram illustrating another embodiment of the invention.

FIG. 2 illustrates another embodiment of the invention. In this embodiment, there are employed a vehicle speed sensor 31 of electromagnetic induction type as a vehicle speed responsive signal generating means and also a digital speed signal conversion circuit comprising a pulse shaping circuit 32a, a counter-latch circuit 32b and a timer circuit 32c as a vehicle speed signal processing unit, while a speed range controller 42 comprises a microprocessor (1 chip microcomputer) 46 and the solenoid driver 44. The microprocessor 46 serves also as an anomaly detecting means and a reset means.

In the vehicle speed sensor 31, a magnetic core with a sensor coil wound thereabout is disposed to face a magnet MG rotating together with a drive shaft. The magnet MG, the magnetic core and the sensor coil constitute the vehicle velocity sensor 31 in combination. With the magnet MG being rotated, AC voltage is induced in the sensor coil and then applied to the pulse shaping circuit 32a. In the circuit 32a, a first operational amplifier OP1 invertedly amplifies the input AC voltage, a second operational amplifier OP2 performs the inverted amplification and level shift adjustment, and first and second transistors Tr1a, Tr2a perform the conversion into binary representation and the inverted amplification. By so doing, vehicle velocity pulses having frequency and a pulse width in accordance with a rotational speed of the magnet MG are applied to a monomultivibrator MM1. The monomultivibrator MM1 is triggered by a rise of each speed responsive pulse and outputs a pulse at a high level "1" for a predetermined short period of time. In such a manner, the monomultivibrator MM1 issues from its output terminal the speed responsive pulses which have a frequency in proportion to vehicle speed and a predetermined pulse width. Thus issued speed responsive pulses are applied to the counter-latch circuit 32b via a NAND gate NA1. The counter latch circuit 32b comprises 4 bit counters CO1, CO2, a latch LA1 and an OR gate OR1, the counter CO1 counting the vehicle speed responsive pulses and the counter CO2 counting carry pulses from the counter CO1. In other words, the counters CO1 and CO2 constitute an 8 bit counter together. Count codes in the counters CO1 and CO2 are memorized into the latch LA1 at a predetermined period and the counters CO1, CO2 are cleared thereafter. Accordingly, memory data in the latch LA represents the number of vehicle speed responsive pulses during the predetermined period, namely the vehicle speed. Update of memories in the latch LA1 and clearance of the contents in the counters CO1, CO2 are controlled by the timer circuit 32c. In the timer circuit 32c, oscillation pulses from pulse oscillator OSC are divided by a counter CO4 and NAND gates NA2, NA3 so as to form a latch indicating pulse and a counter clear indicating pulse. The latter pulse is modified by a monomultivibrator MM2 into a short width pulse. These pulses are used to allow the latch LA1 to make a latch (memory update) and then to momentarily clear the counters CO1, CO2. The pulse used to clear the counters CO1, CO2 is applied at the same time to the computer 46 as a timing pulse A together with the vehicle velocity response pulse B. In addition, latch codes in the latch A1 are also applied to the computer 46 as vehicle speed indicating codes.

The computer 46 further includes input ports connected to the switches ASW and VSW for detecting the throttle opening.

Figure 3:
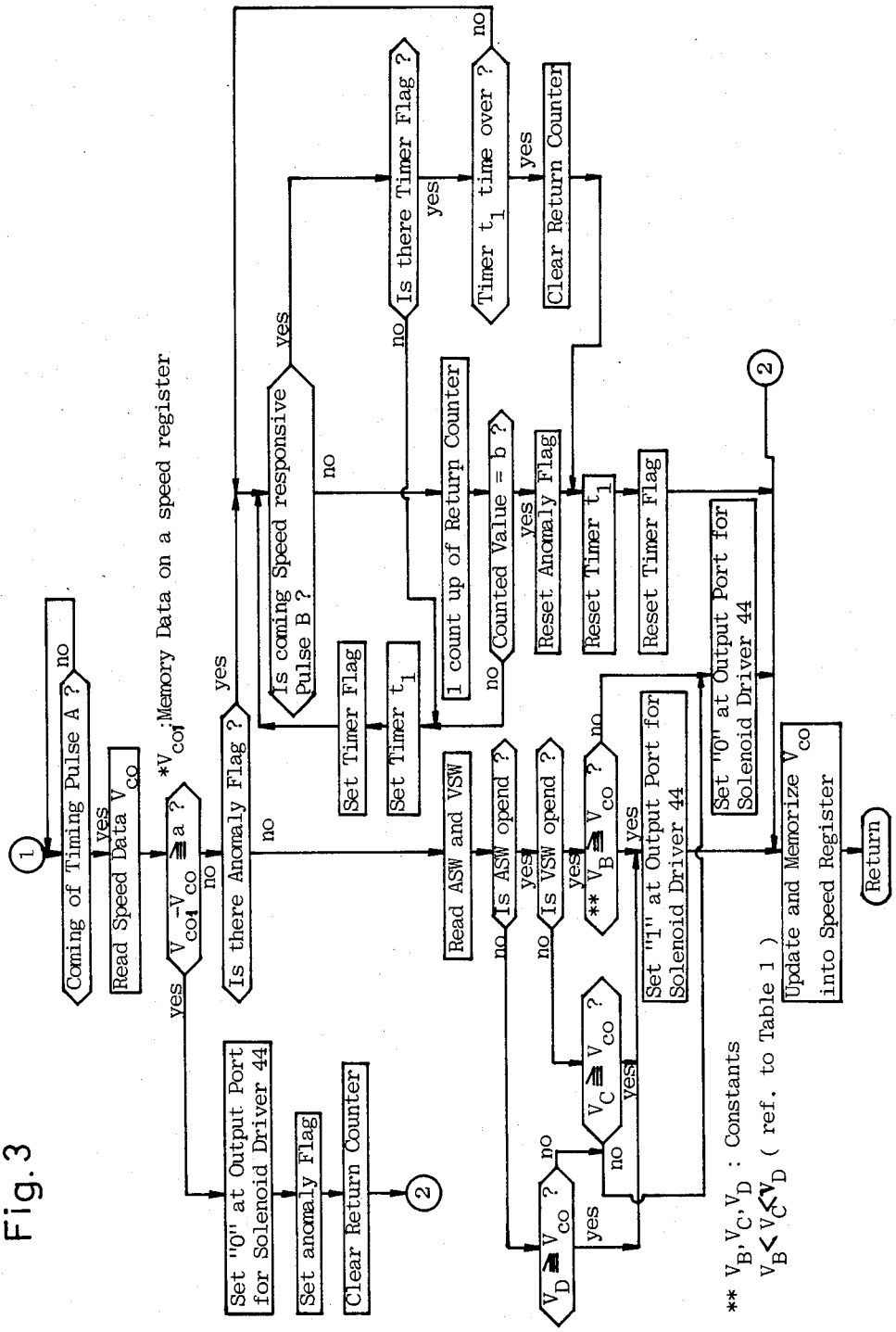
FIG. 3 is a flow chart illustrating the control operation of a microcomputer 46 shown in FIG. 2.

There is incorporated in the computer 46 a ROM which has therein program data to effect similar operations to those performed by the throttle opening detecting circuit 33, the comparator 43, the anomaly detecting circuit 40 and the reset circuit 41 in the foregoing embodiment shown in FIG. 1, as well as constant data referred in the running phase of the operations. FIG. 3 illustrates control operation of the microcomputer 46 in accordance with the program data.

The control operation of the microcomputer 46 will be now described by referring to FIG. 3. Upon arrival of each timing pulse A, the microcomputer 46 reads speed data $V_{CO}$. This speed data $V_{CO}$ is compared with data $V_{CO1}$ which has been read upon arrival of the previous timing pulse A and memorized in a speed register. If $V_{CO1} - V_{CO} \geq a$, or if a level of the velocity signal falls anomalously during one period of the timing pulse A, this is assumed to indicate troubles in the signal line (including the case such that the the wheels are locked due to emergency braking). Thus, the computer 46 sets a low level "0" at its output port for the solenoid driver 44 so as to turn the transistors Tr6, Tr7 OFF, set the automatic transmission 45 at the 2nd speed, and further set an anomaly flag. Then, memory data in a return counter (program counter) is cleared which memorizes the number of detected vehicle speed response pulses B for the decision on anomaly reset, while the speed register is updated to memorize the vehicle speed data $V_{CO}$ just read-out (the above processes mean the anomaly detection and setting of the anomaly detecting state). Thereafter, the microcomputer 46 returns to its main routine, more specifically, returns to the starting point ① of the flow chart as shown in FIG. 3 at the timing of the arrival of pulse A and waits for arrival of the next timing pulse A. When the pulse A is received, it now waits for arrival of the vehicle velocity response pulse B because the anomaly flag is set (Is there an anomaly flag? = YES), and a time interval of $t_1$ starts to be counted during such waiting state (timer $t_1$). When the vehicle speed responsive pulse B arrives during $t_1$, such pulse is counted. And it is assumed to be the normal condition if the pulses B arrive one after another by next at a period shorter than the time interval of $t_1$, and then the number of pulses B is counted continuously. When the counted value exceeds b, this entails the decision of returning to the normal condition, so that the anomaly flag is cleared, the velocity register is updated to memorize the new $V_{CO}$, and the flow is returned to the main routine (the above processes mean the detection of returning to the normal condition and reset of the anomaly detecting state).

In the normal condition, the ON/OFF states of the switches ASW, VSW for use in detecting the throttle opening are read out because there occur such equations as "$V_{CO1} - V_{CO} \geq a? = NO$" and "Is there an anomaly flag? = NO". Similarly to the throttle opening detecting circuit 33 in FIG. 1, constant data $V_B$, $V_C$ or $V_D$ stored in relation to those ON/OFF states is read out from the ROM and then compared with $V_{CO}$. Depending on the difference in their values, a high level "1": the 1st speed range indicating signal or a low level "0": the 2nd speed range indicating signal is set at the output port for the solenoid driver 44, and then $V_{CO}$ is memorized into the velocity register. Getting back to the main routine, the microcomputer 46 returns to the starting point of the flow shown in FIG. 3 at the timing of the pulse A and waits for arrival of another timing pulse A (the above processes mean the comparison with reference signals and setting of the speed shift step).

As mentioned hereinbefore, the microcomputer 46 serves as not only a main part of the speed range controller, but also the anomaly detecting means and the reset means in the foregoing modified embodiment.

Although two embodiments have been described in the above as typical examples, the invention is not limited to those embodiments and may have still other modifications in its practical use. For example, throttle opening sensors of potentiometer type or absolute encoder type may be employed in place of the ASW and VSW. Other than the throttle opening signal there may be utilized various engine power indexing signals such as an intake manifold negative pressure signal, a fuel injection amount signal and other signals corresponding to engine output torque. Furthermore, the automatic transmission may include the capability of equal to or more than 3 speed ranges, while the foregoing transmission has only 2 steps. In addition, decision on the speed shift step may be carried out by running of other logics, for example, such that the ROM is accessed in accordance with the throttle opening and vehicle velocity so as to read the data for indicating the speed range required.

What is claimed is:

1. An automatic transmission control system comprising:
   vehicle speed responsive signal generating means for generating a vehicle speed responsive signal which changes its level at a frequency corresponding to vehicle speed;
   vehicle speed signal processing means for processing said vehicle speed responsive signal and issuing a vehicle speed signal representing the vehicle speed;
   means for generating an engine power indexing signal representing engine power;
   a speed range controller for determining the speed range of an automatic transmission in accordance with speed range reference signals including said engine power indexing signal and vehicle speed signal as well as in accordance with detection of anomalies;

anomaly detecting means for detecting anomalies in said speed range reference signals applied to said speed range controller and outputting an anomaly detection signal to said speed range controller; and reset means for counting the number of level changes in said vehicle speed responsive signal and releasing the anomaly detecting state of said anomaly detecting means when the counted value reaches a predetermined value.

2. An automatic transmission control system according to claim 1, in which said vehicle speed signal processing means is composed of an FV converter circuit including a pulse shaping circuit for pulse shaping said vehicle speed responsive signal to provide vehicle speed responsive pulses.

3. An automatic transmission control system according to claim 2, in which anomaly detecting means includes a differentiation means for detecting a sudden change in output voltage of said FV converter circuit and providing a differentiation signal, a comparison means for comparing a level of the differentiation signal with a reference level and generating an anomaly signal when said level of the differentiation signal becomes out of a predetermined range, and an anomaly setting means for providing said anomaly detection signal to said speed range controller in response to said anomaly signal and for providing a feedback voltage at an input terminal of said comparison means so as to allow said comparison means to continue to issue said anomaly signal.

4. An automatic transmission control system according to claim 3, in which said reset means includes a counter having a count pulse input terminal to receive said vehicle speed responsive pulses and having a CLEAR input terminal to receive said anomaly detection signal, said counter counting the number of said vehicle speed responsive pulses upon the occurrence of said anomaly detection signal and applying to said comparison means a voltage allowing said comparison means to withdraw said anomaly signal upon counting to said predetermined value.

5. An automatic transmission control system comprising:

vehicle speed responsive signal generating means for generating a vehicle speed responsive signal which changes its level at a frequency corresponding to vehicle speed;

vehicle speed signal processing means for processing said vehicle speed responsive signal for detecting vehicle speed;

means for generating an engine power indexing signal representing engine power; and a microprocessor for determining the speed range of an automatic transmission in accordance with the engine power index and vehicle speed, detecting an anomalous change in said vehicle speed, setting said automatic transmission at a safety speed range in the presence of the anomalous change, and then counting the level changes in said vehicle speed responsive signal for setting said automatic transmission at a speed range in accordance with said engine power index and vehicle speed after the counted value reaches a predetermined value.

6. An automatic transmission control system according to claim 5, in which said microprocessor makes a decision that said vehicle speed is subject to the anomalous change if the value of said vehicle speed falls down by an amount greater than a specified value during a predetermined period of time, sets said automatic transmission at the safety speed range upon said decision, and thereafter sets said automatic transmission at the speed range in accordance with said engine power and vehicle speed when vehicle speed responsive pulses occur at a period shorter than a predetermined period.

7. An automatic transmission control system according to claim 5, in which said vehicle speed signal processing means includes a pulse shaping circuit for pulse shaping said vehicle speed responsive signal to obtain vehicle speed responsive pulses, a counter for counting said vehicle speed responsive pulses, a latch means for memorizing count data, and a timer means for controlling the updating of the count data to said latch means and clearance of said counter at a predetermined period.

8. An automatic transmission control system according to claim 7, in which said microprocessor, comparing the present read-out count data with the previously read-out count data for each arrival of pulses with a constant period, makes a decision that said vehicle velocity signal is subject to an anomalous change if the previous counted value is less than the present counted value by an amount greater than a threshold value, sets said automatic transmission at the safety speed range upon said decision, thereafter monitors the arrival of said vehicle speed responsive pulses and sets said automatic transmission at the speed range in accordance with said engine power index and vehicle speed when the period of said vehicle speed responsive pulses becomes shorter than a predetermined period.

* * * * *